United States Patent Office 3,442,317
Patented May 6, 1969

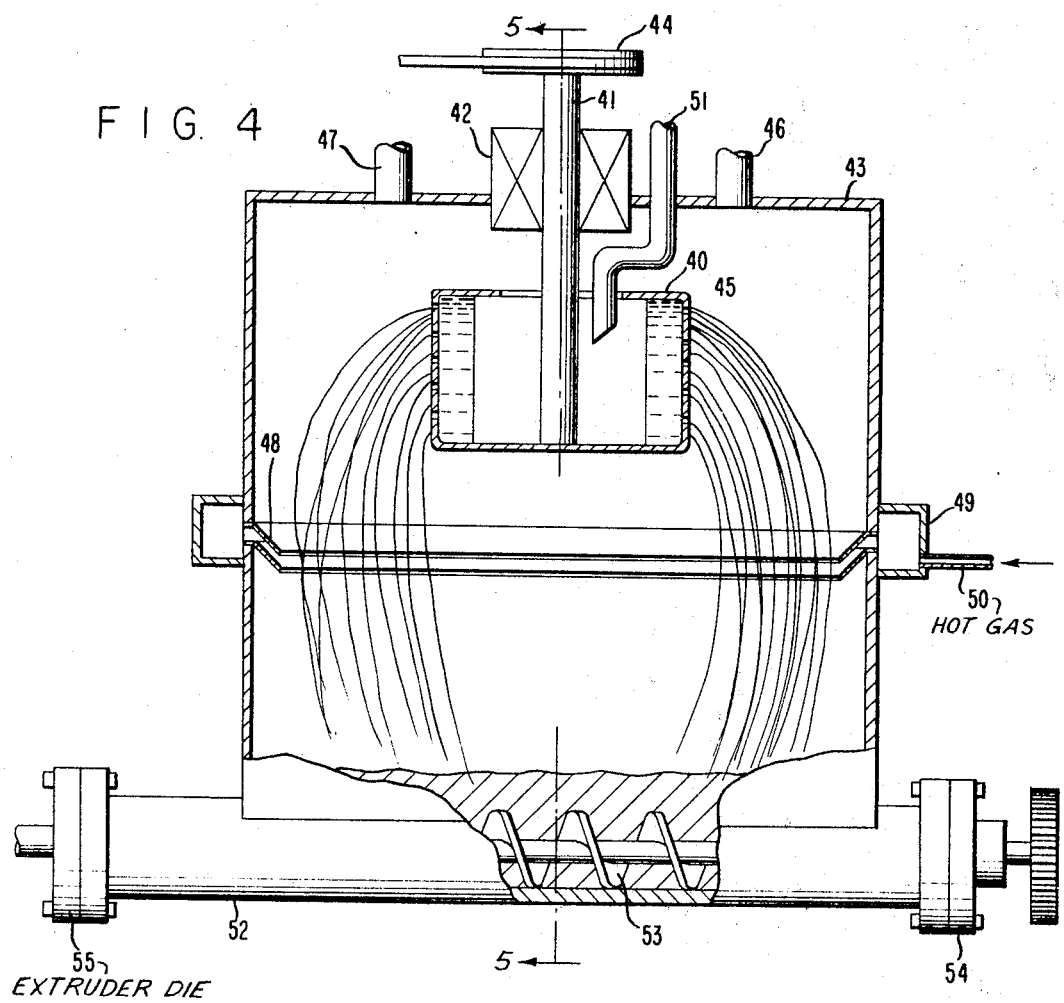
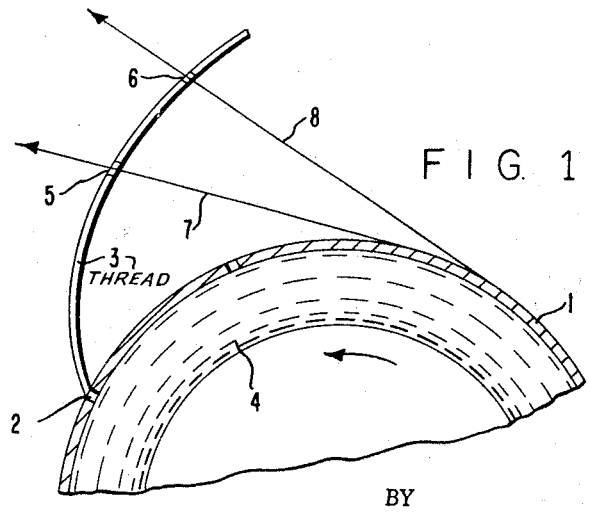

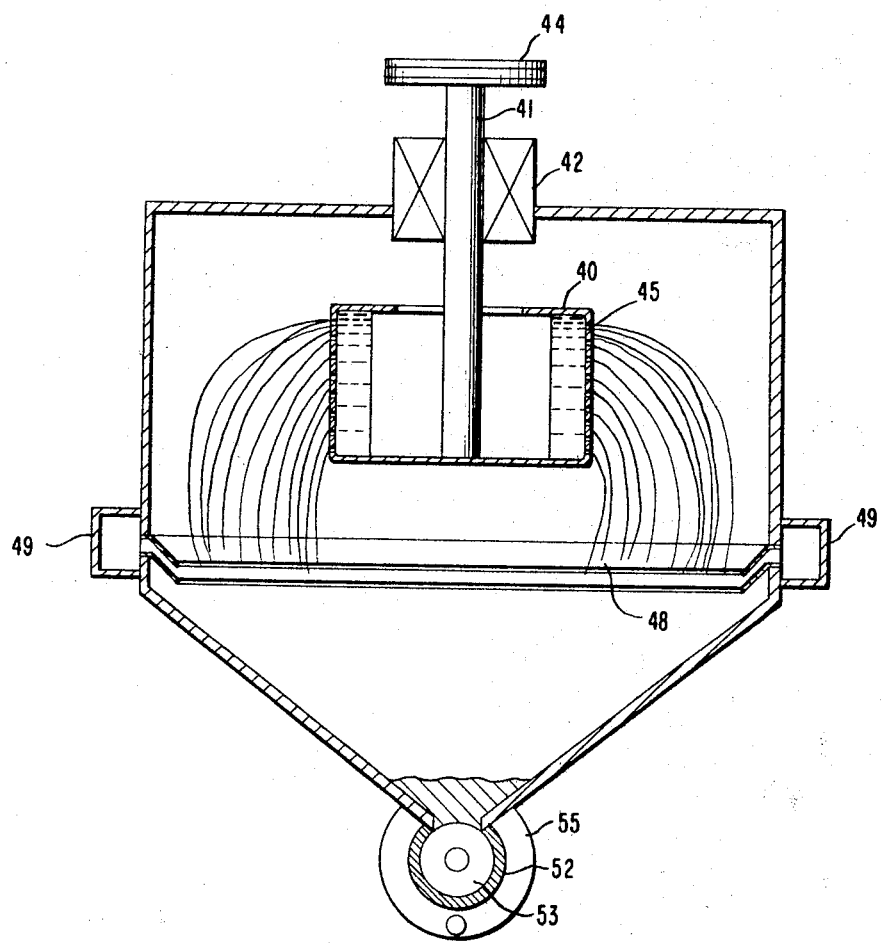

3,442,317
PROCESS FOR ISOLATING ELASTOMERS FROM INTIMATE MIXTURES THEREOF WITH VOLATILE LIQUIDS
Carson E. Wieland, Beaumont, Tex., assignor to E. I. du Pont de Nemours and Company, Wilmington, Del., a corporation of Delaware
Filed Oct. 19, 1965, Ser. No. 497,680
Int. Cl. F26b 3/04; B01d 1/16
U.S. Cl. 159—48                                  1 Claim

ABSTRACT OF THE DISCLOSURE

The recovery of elastomers from intimate mixture with a volatile liquid by introducing said mixture into a rotating chamber with at least one peripheral orifice, said elastomer being recovered in the form of fine filaments in (1) a vaporization zone and (2) a recovery zone, both zones being substantially free of said volatile liquid.

---

Elastomers are normally solid polymeric materials which exhibit rubber-like properties. According to the "Glossary of Terms relating to Rubber and Rubber-like Materials," ASTM Special Technical Publication No. 184, American Society for Testing Materials, Philadelphia, Pennsylvania (1956), at page 38 an elastomer is defined as "A substance that can be stretched at room temperature to at least twice its original length and, after having been stretched and the stress removed returns with force to approximately its original length in a short time."

Elastomers have become of great commercial importance for the fabrication of truck and automotive tires, wire and cable coating, hose, belts and many other articles. In recent years a substantial proportion of the elastomers employed have been obtained by chemical synthesis rather than from natural sources. Such materials are prepared by the polymerization of a suitable monomer or mixture of monomers, generally in the presence of volatile liquid media. The initial product is a solution, emulsion or latex from which it is necessary to isolate the elastomers. Solution technology may be employed to purify synthetic elastomers from catalyst residues or like impurities. Again it is necessary to recover the elastomer from solution in such processes.

The isolation of elastomers from solution or dispersion presents unusual difficulties due to the nature of the solute. For example, if droplets of solutions are sprayed into an evaporation chamber, evaporation of the solvent will proceed until the droplet is encapsulated in an elastic membrane, which greatly retards further evaporation and moreover cannot be disrupted readily by mechanical means to permit the removal of the residual liquid.

The process of the present invention makes possible the recovery of elastomers from dispersions, latexes or from solution in an efficient and rapid manner adapted for use in continuous commercial operation. This process comprises:

(I) Introducing an intimate mixture of an elastomer in a volatile liquid into a rotating chamber having at least one peripheral orifice, the chamber being located within a vaporization zone maintained substantially free from the vapor of the volatile liquid.

(II) Ejecting the mixture from each orifice under pressure into the vaporization zone in the form of substantially coherent filaments, while rotating the container, and (III) Recovering the elastomer substantially free from the volatile liquid in a recovery zone spaced from the rotating chamber.

The process of the present invention is applicable broadly to elastomers as defined hereinabove. One representative class includes rubber-like alpha-olefin homopolymers such as polyhexene and atactic polypropylene, and copolymers of two or more monomers of the formula R—CH=CH$_2$ wherein R is H or an alkyl group having from 1 to 16 carbon atoms, preferably a normal, linear alkyl radical. When ethylene is present in the copolymers its concentration should preferably be in the range of about 20% to about 75% by weight of the composition. Examples of such copolymers are ethylene/propylene copolymers, ethylene/1-butene copolymers, ethylene/1-octene copolymers, propylene/butene copolymers and the like. Another representative class includes copolymers of at least one alpha-olefin and at least one, preferably non-conjugated diene, the ethylenic double bonds of the diene preferably having substantially differing reactivities to polymerization so that substantially linear copolymers are formed having double bonds available for subsequent vulcanization. Examples of such copolymers include ethylene/propylene/1:4-hexadiene; ethylene/propylene/dicyclopentadiene; ethylene/propylene/5-methylene-2-norbornene; ethylene/propylene/5-butenyl-2-norbornene and ethylene/propylene/1:5 cyclooctadiene copolymers. Other elastomers include; natural rubber, cis 1:4 polyisoprene; cis 1:4 polybutadiene; butadiene/styrene copolymer, neoprene; butyl rubber, chlorosulfonated polyethylene; polyurethanes and fluoroelastomers such as copolymers of vinylidene fluoride with perfluoroolefins including hexafluoropropylene, perfluoroalkylperfluorovinyl ethers and the like.

The term "intimate mixture" is used herein to designate true solutions and also dispersions or latexes of elastomers in volatile liquids.

Any liquid medium which can be volatilized may be removed from intimate mixture with an elastomer by the process of this invention, including water, tetrachloroethylene, pentane, hexane, cyclohexane, benzene, carbon tetrachloride, tetrahydrofuran, acetone, and the like. The chemical nature of the solvent is not material to the present invention, except that it will be apparent to those skilled in the art that equipment employed should be constructed of materials which are not dissolved or chemically attacked by the solvent. Usually the liquid medium will be the one in which the elastomer was obtained, prepared or purified. The medium as defined here can also include unreacted monomers which are not polymerizable under the isolation process conditions; thus solutions of polymers made by bulk polymerization can be treated. Mixtures of liquid media can also be employed.

The solids concentration (i.e. weight of normally solid components per unit weight of solution) suitable for operating this process depends on the nature of the elastomer, the nature of the mixture with liquid, whether a true solution or a dispersion, on the size of the orifice through which the mixture is to be extruded and on the extrusion pressure. The concentration should preferably be high in order to minimize costs. However, too concentrated a solution or dispersion may be difficult to extrude satisfactorily. It will be understood by those skilled in the art that elastomer/liquid mixtures in an unsuitable form for use in the practice of this invention, such as thick slurry can be corrected readily by the addition of further solvent and suitable homogenization. As hereinabove stated, suitable concentrations of elastomers may vary with process conditions but in general the solids concentration should be between about 5 to about 20% by weight of the total weight of the solution. The elastomer may be accompanied by other non-volatile components which do not interfere with the process. Examples of such components are: petroleum oils, plasticizers, antioxidants, antiozonants, carbon black and mineral fillers. Those skilled in the art can readily determine by routine experimentation which additives can be tolerated.

When particulate additives are present in the mixture, or when the elastomer is dispersed rather than dissolved the particle size employed should be small compared with the size of the orifice. It is also necessary to take into account any tendency of the polymer to agglomerate.

The shape, length, and arrangement of the orifices about the periphery of the rotating chamber can be selected to suit a particular liquid composition. Typical orifices are circular and have a diameter from about 6 to about 16 mils and a length of from 0.01 to 0.4 inch.

The pressure under which the elastomer/liquid mixture flows through the orifice is the sum of two pressures: (1) the difference in pressure between the interior of the chamber and the vaporization zone and (2) the centrifugal pressure developed by the rotation of the chamber. In general the liquid mixture forms a substantially uniform layer about the periphery of the rotating chamber and the centrifugal pressure is given by $$P = Kn^2 d(r_2 - r_1)^2$$

wherein K is a constant, $n$ is the speed of rotation, $d$ is the density of the liquid, $r_2$ is the radius of the periphery of the chamber, and $r_1$ is the radius to the interior surface of the liquid. In the event that the chamber is filled with liquid, $r_1$ becomes zero. It will be noted that to some extent the process is self regulating in that increasing the volume of liquid within the chamber increases the centrifugal pressure, and hence the flow from the chamber.

In the vaporization chamber the vapors may be removed by sweeping the chamber with a gas such as steam, nitrogen or air. Moreover, vacuum can also be employed. The gas may be heated, preferably to a temperature above the boiling point of the volatile liquid medium at the pressure of the evaporation chamber forming the vaporization zone. The process may be operated at a wide variety of pressures, but generally it is preferred to operate at pressures of about 1 atmosphere or at subatmospheric pressures. The heat of vaporization can be supplied either by superheating the gas used to sweep the chamber or by heating the liquid feed under pressure to a temperature above the boiling point of the liquid at the pressure of the evaporation chamber or by a combination of both methods.

The invention will be better understood by reference to the accompanying drawings, which are intended to illustrate certain embodiments of this invention, but are not to be construed as limiting the scope thereof.

In these drawings:

FIGURE 1 is a diagram showing a portion of the rotating chamber in section and a thread of solution ejected through an orifice, which is intended to illustrate the principles of this invention.

FIGURE 4 shows an end view, in section, of another form of apparatus which can be employed in the practice of this invention, and FIGURE 5 shows a cross-sectional view of the apparatus of FIGURE 4 along the line 5—5.

Figure 2:
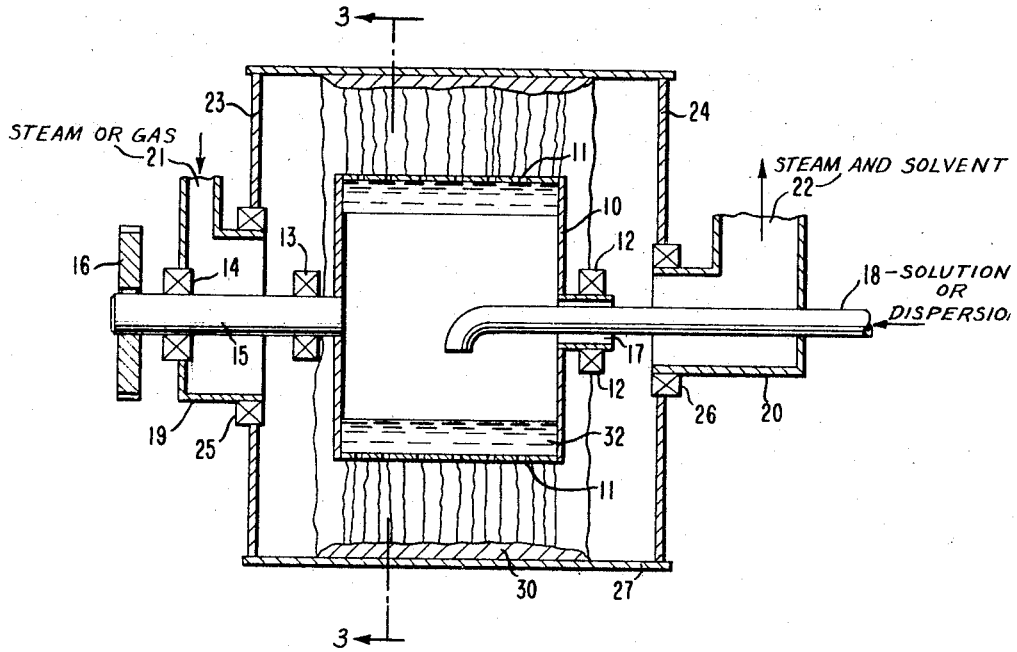
FIGURE 2 is a vertical axial sectional view of an apparatus suitable for the practice of this invention.

Referring now to the drawings:

FIGURE 1 shows a portion of a rotating chamber in section, the periphery 1, having an orifice 2 through which a thread of elastomer solution 3 is ejected. The elastomer solution contained within the rotating chamber forms a substantially uniform layer 4 within the rotating chamber. Each increment of the thread such as 5 and 6 tends to follow a different linear path, indicated by the construction lines 7 and 8 respectively for increments 5 and 6, in the absence of any frictional forces with the surrounding atmosphere. Because the paths of different increments diverge, (the given mass of thread between points 5 and 6 was shorter when they were closer to drum 1), the thread is stretched. Flow through the orifice and frictional forces from the surrounding atmosphere are not involved in the thread stretching. It is possible to obtain a finer thread than can be obtained by simple extrusion and drawing because the stretching force comes from internal inertia distributed throughout the thread, rather than from an external force applied to the end of the thread. This permits substantially complete removal of the solvent by evaporation into the surrounding atmosphere. It will also be observed that the stretching effect is at a maximum for a given speed of rotation when the pressure is at a minimum i.e. when all of the force extruding the elastomer solution is generated by rotation. For this reason, it is preferred that at least 50% of the force of extrusion is centrifugal force. It is a very important feature that the thread is projected through the surrounding space at high velocity, speeds in excess of 100 m.p.h. being readily attainable. The high velocity creates intense intimate contact between the gaseous contents of the evaporation space and the thread of elastomer/liquid mixture, thereby providing very high evaporation rates facilitating efficient removal of the volatile liquid.

Referring to FIGURE 2 of the accompanying drawings, there is shown a rotating chamber 10 having perforations 11 on its outer periphery. The chamber rotates at high velocity in bearings 12 and 13, and seal 14 and is driven by a shaft 15 which is turned by an electric motor (not shown) through gear 16. Opposed to the shaft 15 on the axis of the chamber is a hollow shaft 17 rotating in bearing 12. A solution or dispersion of an elastomer can be introduced into chamber 10 through a pipe 18. The chamber 10 is surrounded by apparatus to collect the dried elastomer threads, which is spaced from its periphery to provide an evaporation zone. Hollow ducts 19 and 20 support the collection apparatus. Duct 19 is equipped with a gas inlet 21 and shaft 20 is equipped with a gas outlet 22. Rotatably mounted on 19 and 20 are circular end plates 23 and 24 which rotate about bearings 25 and 26. Supported by the rotatable end plates is a belt 27 which substantially surrounds the rotating chamber 10.

Figure 3:
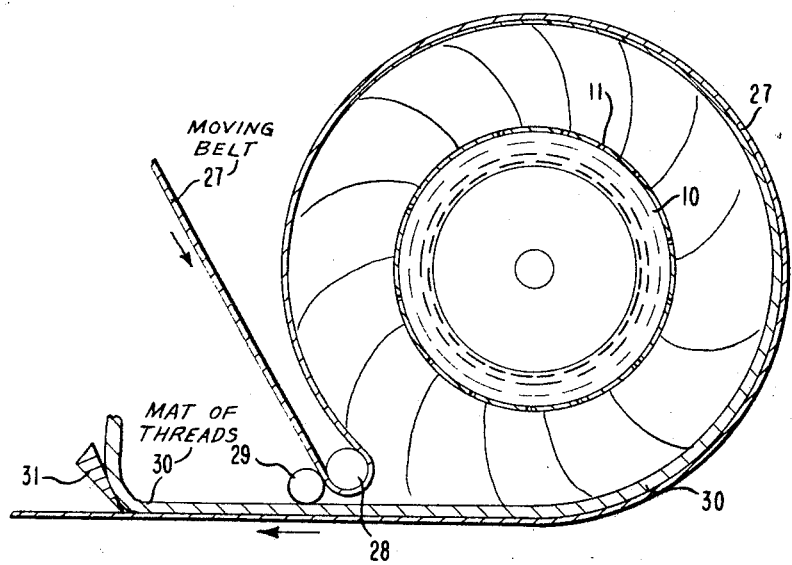
FIGURE 3 is a cross-sectional view of the apparatus of FIGURE 2 along the line 3—3.

Referring now to FIGURE 3 there is shown a section of the apparatus of FIGURE 2 taken along the lines 3—3 of that figure. In this drawing the parts are labelled using identical numbering to that of FIGURE 2. The figure shows chamber 10 substantially surrounded by belt 27 which moves slowly in the direction indicated by the arrows by a suitable belt drive (not shown). The belt passes over roller 28 thence around the chamber 10 guided by the end plates 23 and 24 which do not appear in this figure but are shown in FIGURE 2. A mat of dried elastomer collects on belt 27 as it passes around the chamber, and is thus removed from the evaporation zone formed by the space between belt 27 and chamber 10. A small idler roll 29 contacts belt 27 and the mat of elastomer 30 forming a vapor seal. The mat of dried elastomer is removed from belt 27 by a suitable scraper 31.

Referring to FIGURES 2 and 3, in operation hot steam, or other suitable gaseous evaporation medium is fed into the equipment by inlet 21 and withdrawn through the outlet 22. The chamber 10 is then spun at high velocity, suitably from 500 to 5,000 r.p.m. An intimate mixture (solution or dispersion) of the elastomer in volatile liquid medium is fed into the rotating chamber 10 through pipe 18 to form a liquid layer 32 about the interior of the chamber. The mixture is ejected through the holes 11 and the coherent threads stretched by centrifugal action as explained hereinabove, the liquid medium being evaporated and carried away in the stream of hot gas. The dried threads strike the belt 27 and adhere as a mat 30 which is withdrawn from the vaporization zone by the movement of belt 27 and removed from the belt by the scraper 31.

FIGURE 4 shows a view in section of another form of apparatus which can be employed to practice the process of this invention. The rotating chamber 40 is attached to a vertical drive shaft 41 which passes through a bearing 42 in the outer casing of the evaporation zone 43. The shaft is driven by pully 44 coupled to an electric motor (not shown) by a belt. The chamber 40 has perforations 45 on its periphery. The outer casing 43 is fitted with gas outlets 46 and 47 and with a nozzle 48 directed in a downward direction. The inlet 48 is fed by an annular chamber 49 fitted with a gas inlet 50. Chamber 49 may be fitted with internal baffles to obtain a uniform flow of gas into the nozzle 48. An inlet 51 directed into the rotating chamber 40 is provided to supply the intimate mixture of elastomer and volatile liquid into the apparatus. The lower part of the casing terminates in channel 52 containing an extrusion screw 53 which is sealed by a bearing 54 at one end through which the screw shaft passes. Drive means (not shown) are attached to the end of the shaft passing through the bearing 54. The other end of the channel 52 terminates in a die 55.

In operation a hot gaseous medium is introduced through the inlet 50 and enters the casing through the slot 48, the gas being exhausted through outlets 46 and 47. The chamber 40 is rotated at high speed and the elastomer/liquid mixture is then introduced at a suitable rate through inlet 51. Threads of drying elastomer are ejected through the holes 43 into the space produced by the casing 43 which is sufficiently large that the threads fall downwardly to the extruder screw 53 the jet of gas entering the chamber through the nozzle 48 assists in directing the threads to the extrusion channel whence the elastomer is collected and forced through the die 55 by the extrusion screw 53.

FIGURE 5 shows another section of the apparatus taken along the lines 5—5 in FIGURE 4. In this drawing identical parts are marked with the same numbers employed in FIGURE 4.

Many modifications of the apparatus and process of this invention can be made. Thus the rotating chamber can be sealed and the liquid elastomer/volatile liquid mixture introduced through an axial inlet at a pressure greater than that of the evaporation chamber. The rotating chamber may be fitted with baffles to assist the liquid elastomer mixture to acquire the rotational velocity of the chamber. These and other modifications of this invention will be apparent to those skilled in the art.

This invention will be further understood by reference to the following specific examples, which are intended by way of illustration only and should not be construed as limiting the scope of the claims appended hereto.

EXAMPLE I

The test was made in a laboratory centrifuge. Centrifuge tubes (IEC 320) were modified. A hole was drilled into the bottom of each tube and a short section of 25-gage hypodermic needle was soldered therein. The resulting orifice was about 6 mils in diameter and about 3/16-inch long. In the centrifuge the rotating radius of the bottom of the tube was 8 inches; there was a 3.5 inch clearance between the tube and the centrifuge wall. The centrifuge was heated by inserting a "flameless blowtorch" into the bottom drain hole.

A tetrachloroethylene solution was employed containing 7.5 weight percent of a copolymer characterized by a Mooney viscosity (ML-4/250° F.) of 40 and the following composition (by weight): ethylene units 52%; propylene units, 44%; 1,4-hexadiene units, 4%. This copolymer had been prepared in tetrachloroethylene in the presence of a diisobutyl aluminum monochloride/vanadium oxytrichloride coordination catalyst according to the general procedures of U.S. Patent 2,933,480.

After the centrifuge, centrifuge tubes, and copolymer solution had been preheated, the tubes were loaded with copolymer solution, balanced, and inserted into the centrifuge as quickly as possible. After the tubes had been rotated for the desired time, the isolated copolymer was stripped from the centrifuge wall where it had been collected in a band about 0.5-inch wide. The centrifuge was heated to 60° C. and each tube loaded with 40 milliliters of a 7.5% solids solution at 75° C. The copolymer collected by rotating the tubes for 3 minutes at 2900 r.p.m. had 3.25% volatiles. About 25 milliliters of solution remained in each tube; the temperature was 65° C. When this residue had been rotated for another 5 minutes at 3100 r.p.m. about 15 milliliters were extruded; the copolymer isolated therefrom had only 0.92% voltatiles.

EXAMPLE II

A commercial centrifuge was employed for this example. The rotating container was a 12-inch diameter basket equipped with 8 holes evenly spaced around the rim in a row 1½ inches from the top. Each hole had a length of 0.25 inch and a diameter of 0.016 inch. Solution was fed into the basket via a pipe extending down through the cover. The rotating container was seated in a centrifuge housing which was provided with a hot air inlet at the base serviced by a heater and an air line.

The basket was continuously rotated at 2900 r.p.m. During the hour operating period 3100 grams of copolymer solution (as in Example I except for 9% solids concentration) was fed at 93° C. at 17,000 cps. viscosity; this is equivalent to a viscosity of 7500 cps. at the housing temperature of 124° C. At the start the rim pressure resulting from rotation was 68 p.s.i.; at the finish it was 78 p.s.i. Air was introduced continuously into the centrifuge housing to maintain an average temperature of 124° C. The copolymer solution emerged form the holes at 0.72 ft./sec.; the solution thread diameter was 0.0012 inch; the dry thread diameter was 0.0005 inch. In all, 115 grams of copolymer were collected having only 0.94% volatiles.

I claim:
1. A process for isolating an elastomer from an intimate mixture of the elastomer with a volatile liquid comprising:
(a) introducing said mixture of an elastomer and a volatile liquid into a rotating chamber having at least one peripheral orifice,
(b) rotating the chamber to eject the mixture through the orifice forming a coherent spiral filament,
(c) vaporizing the volatile liquid in the coherent filament by sweeping the coherent filament through a surrounding, rotating vaporzation chamber where the partial pressure of the volatile liquid is below the equilbrium vapor pressure of the volatile liquid at the temperature of an inert sweep gas and removing the vapor by a stream of said inert gas,
(d) collecting the filament from the vaporization chamber peripheral wall as a mat of threads on its concentricallly moving surface.

References Cited

UNITED STATES PATENTS

| | | | |
|---|---|---|---|
| 3,163,587 | 12/1964 | Champe | 202—236 |
| 2,533,125 | 12/1950 | Levinson et al. | 159—7 |
| 2,043,378 | 6/1936 | Igarashi et al. | |
| 2,439,384 | 4/1948 | Fetzer | 150—47 X |
| 2,719,776 | 10/1955 | Kummel | 18—54 |
| 2,873,799 | 2/1959 | Earley et al. | 159—49 |
| 2,455,174 | 11/1948 | Hitt | 18—54 |

NORMAN YUDKOFF, *Primary Examiner.*

J. SOFER, *Assistant Examiner.*

U.S. Cl. X.R.

159—49, 7; 264—8